Oct. 7, 1924.

W. P. DEVINE 1,510,463

TUBULAR ARTICLE FOR SPECTACLE FRAMES

Filed May 1, 1924

Inventor:
William P. Devine,
by his attorney,
Charles L. Gooding.

Patented Oct. 7, 1924.

1,510,463

UNITED STATES PATENT OFFICE.

WILLIAM P. DEVINE, OF DORCHESTER, MASSACHUSETTS, ASSIGNOR OF ONE-HALF TO HARRIS KING HALIKMAN, OF BOSTON, MASSACHUSETTS.

TUBULAR ARTICLE FOR SPECTACLE FRAMES.

Application filed May 1, 1924. Serial No. 710,442.

*To all whom it may concern:*

Be it known that I, WILLIAM P. DEVINE, a citizen of the United States, residing at Dorchester, in the county of Suffolk and State of Massachusetts, have invented new and useful Improvements in Tubular Articles for Spectacle Frames, of which the following is a specification.

This invention relates to a tubular article from which spectacle or eye glass frame blanks can be manufactured.

In the manufacture of spectacle and eye glass frames, it is customary to stamp the frame blanks out of a sheet of celluloid. As will be readily seen, this leads to a great amount of waste, and it is the object of this invention to eliminate such waste, and this is accomplished by my invention by molding or otherwise forming an article from plastic material, such as celluloid, the article consisting of a pair of tubes joined together by a cross bar, the article being of sufficient length, and of a cross sectional contour such that a plurality of spectacle or eye glass frame blanks can be cut therefrom by cutting the article transversely of the tubes thereof into sections, each of which constitutes a spectacle frame blank, and thus substantially all waste is eliminated in the manufacture of the spectacle or eye glass frame blanks.

The invention consists in an article of the character set forth, and particularly pointed out in the claims.

Referring to the drawings:—

Like numerals refer to like parts in the views of the drawings.

Figure 1:
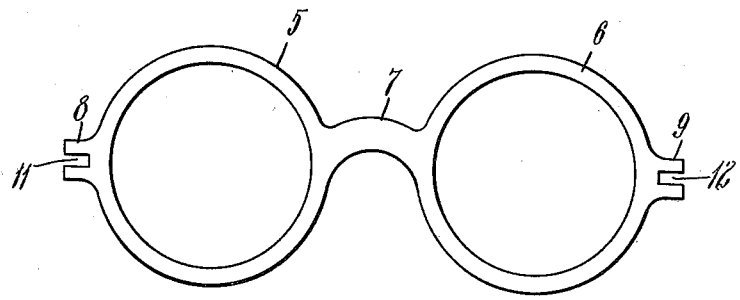
Figure 1 is a front elevation of an article embodying my invention.

In the drawings, 5 and 6 are tubes connected together by a bridge 7. Flanges 8 and 9 are provided in the periphery of each of the tubes 5 and 6 respectively, and these flanges extend longitudinally of the tubes and are positioned approximately diametrically opposite the cross bar 7.

Figure 2:
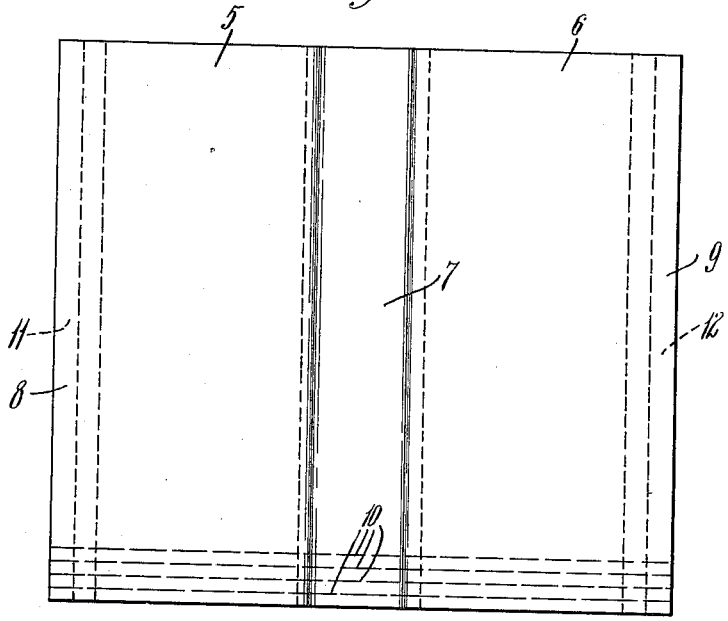
Fig. 2 is a plan view of the same.

The article is manufactured by molding or otherwise forming the same from any suitable plastic material, such as celluloid, when the material is softened by heat, and subsequently strips of the material are cut from the molded article along the lines 10, Fig. 2, thus forming spectacle frame blanks, see Fig. 3. The article of my invention may be molded in a manner well known to those skilled in the art in a two-part separable mold with cores positioned therein for the bore of the tubes of the article.

In some styles of spectacle frames, the temples of the spectacles are pivotally mounted in a slot, and therefore, the article of this invention, for such styles of spectacle frames, is provided with slots 11 and 12 extending longitudinally of the flanges 8 and 9.

Figure 3:
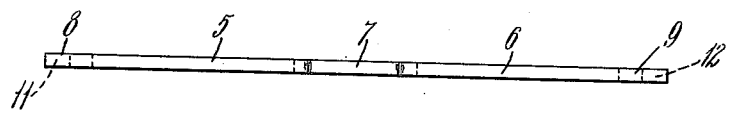
Fig. 3 is a plan view of a spectacle frame blank as it appears after being severed from the article of this invention, the front elevation thereof being the same as in Figure 1.

The spectacle frame blank, after being severed from the article, is illustrated in Fig. 3 in plan view and in front elevation it is the same as Figure 1.

In the specification and in the claims the words spectacle frame blanks is intended to include eye glass frame blanks.

I claim:

1. An article of manufacture comprising a pair of tubes and a cross bar joining them together and integral therewith, said article being of sufficient length and of such a cross sectional contour that it may be subdivided transversely thereof into a plurality of spectacle frame blanks.

2. An article of manufacture comprising a pair of tubes of hardened plastic material and a cross bar joining them together and integral therewith, said article being of sufficient length and of such a cross sectional contour that it may be subdivided transversely thereof into a plurality of spectacle frame blanks.

3. An article of manufacture comprising a pair of tubes of celluloid and a cross bar joining them together and integral therewith, said article being of sufficient length and of such a cross sectional contour that it may be subdivided transversely thereof into a plurality of spectacle frame blanks.

4. An article of manufacture comprising a pair of tubes and a cross bar joining them together and integral therewith, said article being of sufficient length and of such a cross sectional contour that it may be subdivided transversely thereof into a plurality of spectacle frame blanks and a flange on the periphery of each of said tubes extending longitudinally thereof and approximately diametrically opposite said cross bar.

5. An article of manufacture comprising a pair of tubes and a cross bar joining them together and integral therewith, said article being of sufficient length and of such a cross sectional contour that it may be subdivided transversely thereof into a plurality of spectacle frame blanks, and a slotted flange on the periphery of each of said tubes extending longitudinally thereof and approximately diametrically opposite said cross bar.

6. The herein described process of manufacturing spectacle frame blanks which consists in forming an article of plastic material with a cross sectional contour like that of a spectacle frame blank and then sub-dividing the article transversely thereof into a plurality of sections, each of which constitutes a spectacle frame blank.

In testimony whereof I have hereunto set my hand in presence of two subscribing witnesses.

WILLIAM P. DEVINE.

Witnesses:
CHARLES S. GOODING,
FRANKLIN E. LOW.